(No Model.)
J. WARD.
DEVICE FOR TRANSMITTING POWER.
No. 314,207. Patented Mar. 17, 1885.
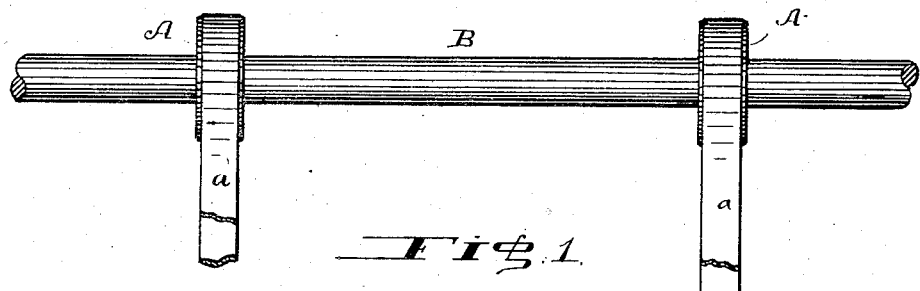
Fig. 1.
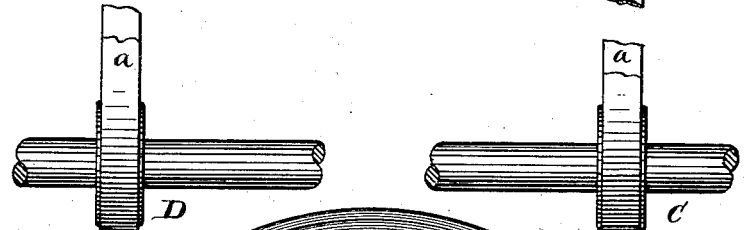
Fig. 2.
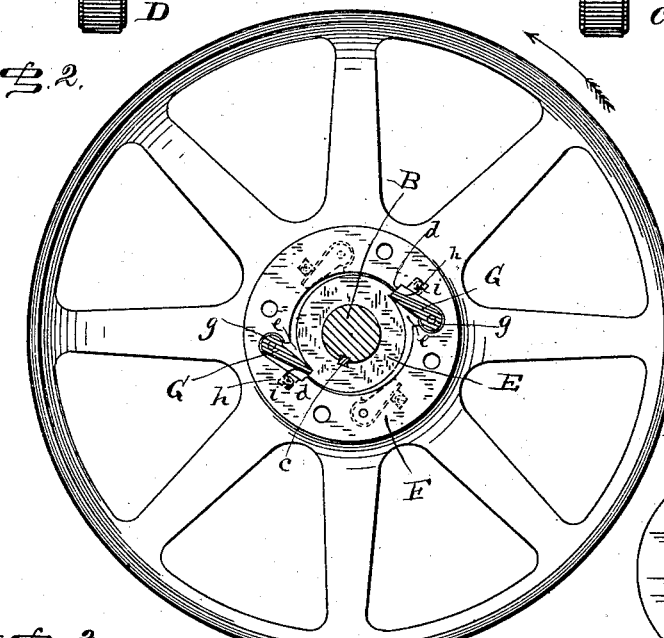
Fig. 4.
Fig. 3.
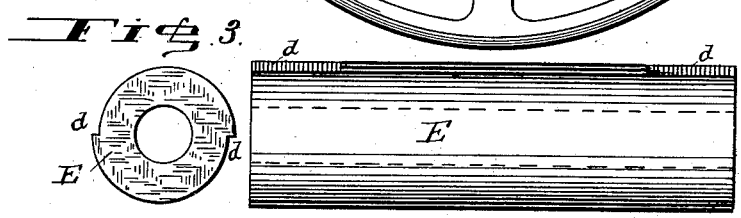
WITNESSES
C. T. Belt
William Paxton
INVENTOR
Joseph Ward
By,
Paine & Ladd, Attorneys
N. PETERS, Photo-Lithographer, Washington, D. C.

UNITED STATES PATENT OFFICE.

JOSEPH WARD, OF MANCHESTER, N. H., ASSIGNOR OF TWO-THIRDS TO JOHN ASHTON AND FREDERICK J. MARTIN, BOTH OF SAME PLACE.

DEVICE FOR TRANSMITTING POWER.

SPECIFICATION forming part of Letters Patent No. 314,207, dated March 17, 1885.

Application filed September 26, 1884. (No model.)

*To all whom it may concern:*

Be it known that I, JOSEPH WARD, a citizen of the United States, residing at Manchester, in the county of Hillsborough and State of New Hampshire, have invented certain new and useful Improvements in Transmitting Power; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements for transmitting power from independent motors or sources of mechanical power to a common shaft, or to a series of drive-pulleys mounted thereon.

The invention further has reference to an improvement in pulleys, hereinafter explained and set forth.

In the accompanying drawings, forming a part of this specification, Figure 1 is a diagrammatic view illustrating the arrangement for transmitting power contemplated by my invention. Fig. 2 is a side elevation, partly in section, of one of the improved pulleys, and Figs. 3 and 4 are detailed views.

The invention consists, primarily, in constructing and arranging a series of hand or drive pulleys upon a shaft common or universal to all, so that each of said pulleys may be driven or derive its movement from an independent motor or source of power, and be capable of a cessation of its rotation without affecting the movement of the other pulleys on the shaft.

In furtherance of the above two or more pulleys, A, are mounted on a shaft, B, and are each driven in the same direction by independent motors C D through the intermediate agency of transmitting-belts a. At the point where each of said pulleys is located on the shaft B a cam-sleeve, E, embraces the said shaft B, and is engaged by a spline or feather, c, on said shaft, so as to revolve therewith. Each end portion of the said sleeve E is provided with two peripheral cam-shoulders, d, each pair of which are located diametrically opposite each other, as indicated in Fig. 2. The shoulders of each end of the said sleeve E are so formed on the said sleeve relative to the shoulders of the other end that each pair of shoulders alternate regularly with the shoulders of the other end, as will be well understood by the dotted lines indicated in Fig. 2. The opening in the hub F of each pulley A is of such dimensions as to enable said pulley to be easily placed upon its particular sleeve E so that it can turn freely thereon. The said hub F is provided at each side with a pair of recesses, e, located diametrically opposite to each other, and of the shape illustrated most clearly in Fig. 2. Each of said recesses is extended into a circular depression, f, which is adapted to permit the lateral insertion of the cylindrical end portions, g, of a dog, G, the bearing of said cylindrical portion in the circular depression being such as to permit a limited play of the dog therein, but without permitting its complete removal therefrom. A cavity, h, formed in the hub F adjacent to each dog G is designed to contain a spiral or coil spring, i, which bears against the free end of the dog and normally maintains the same in contact with the adjacent surface of the sleeve E.

It will be understood by reference to the dotted lines, Fig. 2, that the pair of dogs on the opposite side of the hub F alternate with those illustrated in full lines, Fig. 2.

With a pulley arranged and mounted on a shaft as above described, movement imparted thereto so as to cause the same to revolve in the direction indicated by the arrow, Fig. 2, will result in the dogs G contacting with the cam-shoulders d of the sleeve E, thereby turning said cam coincidently with said pulley and likewise revolving the shaft. A reverse movement of the said pulley will result in the dogs G riding over the surface of the cam-sleeve E without affecting the shaft B, the recesses e being of sufficient depth to permit the curved faces of the said cam-shoulders to force the dogs back in said recesses. Now, when a series of said pulleys are arranged on the same shaft, and individually driven by an independent motor, or from an independent source of power, as shown in Fig. 1, the stoppage or cessation of any one of the said motors or source of power will only result in stopping the revolution of its particular pulley, without affecting the rotation of the shaft B and the other pulleys thereon. This may be readily comprehended by reference to Fig. 2, wherein it will be observed that if the pulley A were maintained stationary, and the shaft B and sleeve E revolved in the direction of the arrow in said figure, the dogs would be forced back into their recesses, as before explained, without effecting any engagement of parts.

The importance and utility of the improvement will be appreciated in instances where a prime shaft and a series of driving-pulleys thereon are driven from independent motors or sources of power, and where one or more of said pulleys are likely at any time to become accidentally stopped or reversed.

To protect the parts from the entrance of dust and other foreign matter, and also prevent the accidental removal of the dogs and their springs, circular plates H are adapted to be mounted on the shaft and secured over the end of each sleeve and hub by means of screws or other securing devices.

I claim—

1. The improved means of transmitting power herein described, consisting of a shaft, a series of pulleys mounted thereon and adapted to revolve the same when turned in one direction only, and each being driven from a motor independent of the motor or motors of the other wheel or wheels, substantially as set forth.

2. The combination, in a device for transmitting power, of a shaft, a sleeve, E, spring-dogs, pulley, and cam-shoulders adapted to engage said dogs, substantially as set forth.

In testimony whereof I affix my signature in presence of two witnesses.

JOSEPH WARD.

Witnesses:
JOHN ASHTON,
FREDERICK J. MARTIN.